United States Patent [19]

Locker et al.

[11] 4,065,702
[45] Dec. 27, 1977

[54] DRIVE SYSTEM FOR HIGH INERTIA LOAD

[76] Inventors: Daniel Locker, 18 Bialik Street; Moshe Miller, Sanhedria Murhevet 124/5, both of Jerusalem, Israel

[21] Appl. No.: 669,664

[22] Filed: Mar. 23, 1976

[30] Foreign Application Priority Data

July 31, 1975 Israel ................................. 47843

[51] Int. Cl.² .............................................. H02K 7/02
[52] U.S. Cl. ................................... 318/161; 180/65 A
[58] Field of Search ...................... 318/161; 180/65 A

[56] References Cited

U.S. PATENT DOCUMENTS

| 3,858,674 | 1/1975 | Tabor | 180/65 R |
| 3,923,115 | 12/1975 | Helling | 180/65 A |

Primary Examiner—Robert K. Schaefer
Assistant Examiner—John J. Feldhaus
Attorney, Agent, or Firm—Benjamin J. Barish

[57] ABSTRACT

A drive system for a high-inertia load, such as a motor vehicle including a fly-wheel, comprises a prime-mover for setting the high-inertia body into motion and for maintaining the motion thereof during the operation of the drive system, a driven device driven by the high-inertia body, a bi-directional variable speed unit coupling the high-inertia body to the driven device for controlling its speed during the operation of the drive system such that when the driven device is accelerating it draws energy from the high-inertia body, and when it is decelerating it returns energy to the high-inertia body, and a control system automatically controlling the prime-mover to supply sufficient energy to the high-inertia body to make up for losses. Two types of control systems are described, one being energy-responsive, and the other being power-responsive.

10 Claims, 3 Drawing Figures

DRIVE SYSTEM FOR HIGH INERTIA LOAD

BACKGROUND OF THE INVENTION

The present invention relates to drive systems for high-inertia load devices. The invention is particularly useful with respect to motor vehicle drive systems including fly-wheels, such as described in U.S. Pat. No. 3,858,674, and is therefore described below with respect to that particular application, but it will be appreciated that the invention could advantageously be used in other applications as well, such as for driving heavy machinery whose speed must be frequently varied.

U.S. Pat. No. 3,858,674 describes a drive system including an electrical motor and flywheel particularly useful for electrical motor vehicles. Such a drive system includes a bi-directional variable speed unit coupling the flywheel, serving as a high-inertia body, to the driven electric motor vehicle, for controlling the speed thereof such that when the vehicle is accelerating, it draws energy from the flywheel, and when it is decelerating, it returns energy to the flywheel.

SUMMARY OF THE INVENTION

The present invention is directed to a control system particularly useful with respect to such a drive for controlling the electric motor, or other prime-mover that may be used for rotating the flywheel, so that a minimum quantity of energy is needed from the prime-mover during the operation of the system.

According to a broad aspect of the present invention, there is provided a drive system, comprising: a high-inertia body; a prime-mover for setting the high-inertia body into motion and for maintaining the motion thereof during the operation of the drive system; a driven device driven by the high-inertia body; a bidirectional variable speed unit coupling the high-inertia body to the driven device for controlling the speed thereof during the operation of the drive system such that when the driven device is accelerating it draws energy from the high-inertia body, and when it is decelerating it returns energy to the high-inertia; and a control system automatically controlling the prime-mover to supply sufficient energy to the high-inertia body to make up for losses during the operation of the drive system.

As mentioned above, the preferred embodiment of the invention is one in which the high-inertia body is a flywheel and is rotated by the prime-mover.

Two general forms of control systems are described below. In one form, the control system is an energy-responsive one and includes: first energy measuring means for continuously measuring the kinetic energy of the flywheel; second energy measuring means for continuously measuring the kinetic energy of the driven device; summing means for summing the two measurements and for substracting the sum from a reference value to produce a control signal corresponding to the difference between said sum and reference values; and control means for controlling the prime-mover in accordance with said control signal.

In this described form, the reference value is equal to the kinetic energy of the flywheel when rotating at its maximum operational velocity, at which time the driven device moves at zero velocity.

In a second described form, the control system is a power-responsive one and includes: first power measuring means for continuously measuring the power input or output of the flywheel; second power measuring means for continuously measuring the power input or output of the driven device; summing means for substracting one of said two measurements from the other and producing a control signal corresponding to the difference therebetween; and control means for controlling the prime-mover in accordance with said control signal. In this described form, the control system further includes means effective, when the velocity of the driven device is zero, to control the prime-mover to supply sufficient energy to bring the angular velocity of the flywheel to its maximum operational velocity.

It will be seen that the system constructed in accordance with the invention operates by the transfer of energy from the high-inertia body (e.g., flywheel) to the driven device (e.g. motor vehicle) during the acceleration of the driven device, the high-inertia body receiving energy from the driven device during the deceleration of the latter. Thus, the only energy that needs to be supplied by the prime-mover is that to initially rotate the flywheel to its maximum operational velocity, and to make-up the energy lost because of mechanical irreversibility, e.g. friction losses, windage losses, etc. Thus, relatively small prime-movers, such as electric motors or internal combustion engines, may be used.

The energy-responsive system has an advantage over the power-responsive system in that the energy-responsive system continuously compares the total energy of the two bodies with a reference value and continuously supplies the needed energy for maintaining the reference value. Thus, there is no accumulation of errors. The power-responsive system has the disadvantage that there is an accumulation of errors, but the advantage that the errors can be made-up at the most convenient time, i.e., when the power demand from the prime-mover mover is the least. This can be done by checking the rotational velocity of the flywheel when the driven device (motor vehicle) is at zero velocity, and at that time causing the prime-mover to supply sufficient energy to the flywheel to bring its velocity up to its operational maximum velocity.

Further features and advantages of the invention will be apparent from the description below.

BRIEF DESCRIPTION OF THE DRAWINGS

The invention is herein described, somewhat diagramatically and by way of example only, with reference to the accompanying drawings wherein.

DESCRIPTION OF THE PREFERRED EMBODIMENTS

Figure 1:
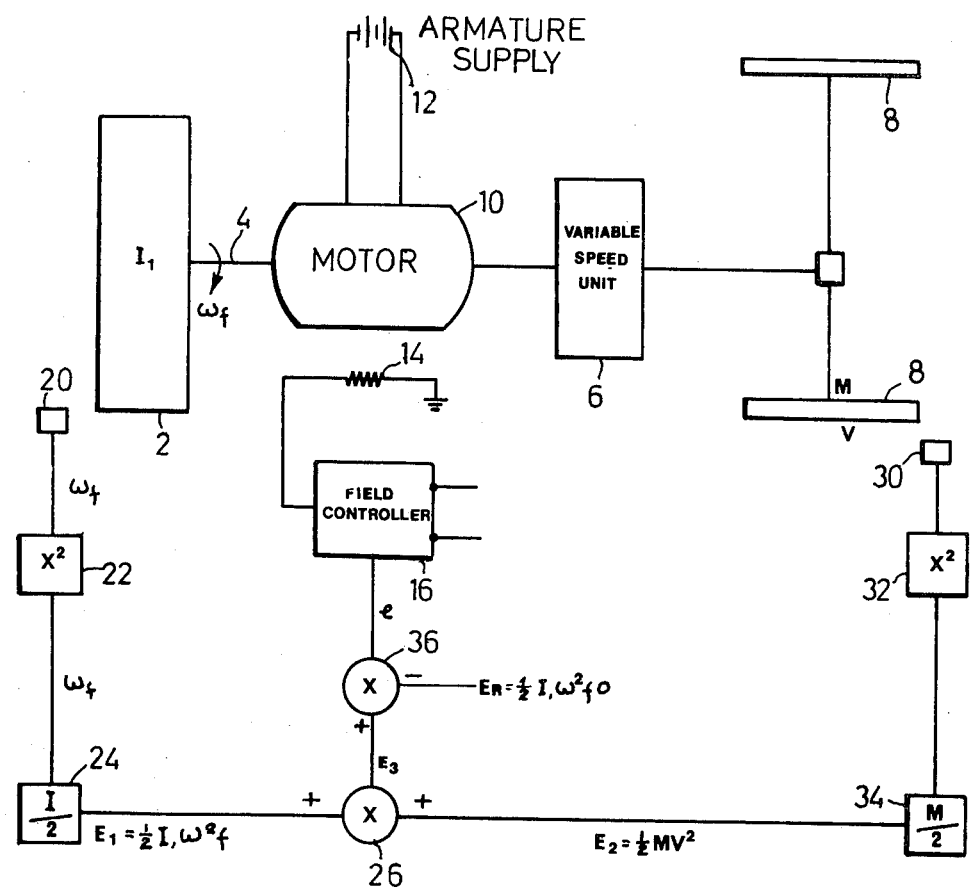
FIG. 1 is a block diagram illustrating one form of energy-responsive control system in accordance with the invention, this form including an electric-motor prime-mover.

FIG. 1 illustrates an energy-responsive control system in which the prime-mover is an electric motor. The system of FIG. 1 includes a high inertia body 2 in the form of a flywheel fixed to a shaft 4, which shaft is coupled, via a variable speed unit 6, to the driven device, in this case a motor vehicle having drive wheels 8. The electric motor prime-mover is generally designated 10, and its armature is coupled to shaft 4 for driving fly wheel 2. Motor 10 is of the shunt-wound type, including a power supply 12 for its armature, and a shunt field 14 supplied via a field controller 16. The output torque of the motor is controlled by field controller 16.

Variable speed unit 6 may be a hydrostatic transmission, a variable V-belt drive, a cone-drive, or another form of continuously variable transmission. It controls the speed of the electric vehicle (its drive wheels 8) such that when the motor vehicle is accelerating, it draws energy from flywheel 2, and when it is decelerating, it returns energy to the flywheel. Thus, the variable speed unit 6 varies the ratio of speeds between flywheel 2 and the motor vehicle 8, and causes a transfer of kinetic energy from one body to the other, the electric motor 10 supplying only as much energy as is lost because of mechanical irreversibility (e.g., friction and windage losses).

In FIG. 1, the control system which controls the shunt-winding 14 of motor 10 to supply the make-up of energy is an energy-responsive system. It includes a sensor 20 for continuously measuring the angular velocity of flywheel 2 and producing an electrical signal ($w_f$) corresponding thereto, and a squaring circuit 22 for squaring the value of that electrical signal ($w_f^2$). The control system further includes multiplier circuit 24 which multiplies the squared value from circuit 22 by one-half the inertia of flywheel 2. The resulting signal ($E_1 = \frac{1}{2} Iw_f^2$) is thus a measurement of the kinetic energy of flywheel 2. This product is fed to summing circuit 26.

The kinetic energy of the vehicle is measured by a circuit including a sensor 30 for measuring the linear velocity of the vehicle and producing an electrical signal (V) corresponding thereto, a squaring circuit 32 which squares the value of the latter electrical signal ($V^2$,) and a multiplier circuit 34 which multiplies the squared value by one-half the mass of the vehicle, to produce an electrical signal ($E_2 = \frac{1}{2} MV^2$) corresponding thereto. This electrical signal corresponds to the measurement of the kinetic energy of the vehicle and is fed into a second input of summing circuit 26.

Summing circuit 26 sums the two measurements ($E_3 = E_1 + E_2$), and produces an output which corresponds to the total kinetic energy of the flywheel 2 and the vehicle 8. This output is fed to a further summing circuit 36, which circuit also receives a reference value ($E_r$) supplied by a reference input 38. The latter reference value is equal to the energy of the flywheel 2 when rotating at its maximum operational value i.e., $E_r = \frac{1}{2} Iw_{fo}^2$), at which time the vehicle linear velocity is zero.

This reference kinetic energy is substracted from the total kinetic energy from summing circuit 26 to produce an error signal ($E_4 = E_3 - E_r$). This error signal is used to control the field controller 16 of the motor 10, causing the motor to supply sufficient energy to reduce this error signal to zero.

It will thus be seen that the system illustrated in FIG. 1 enables the ratio of speeds of the two inertia bodies (i.e. flywheel 2 and motor vehicle 8) to be varied over a wide range, by effecting a transfer of kinetic energy between the two bodies such that the sum total of kinetic energy of the two bodies is maintained essentially constant, prime-mover 10 providing only as much energy as is necessary to make-up for losses.

Figure 2:
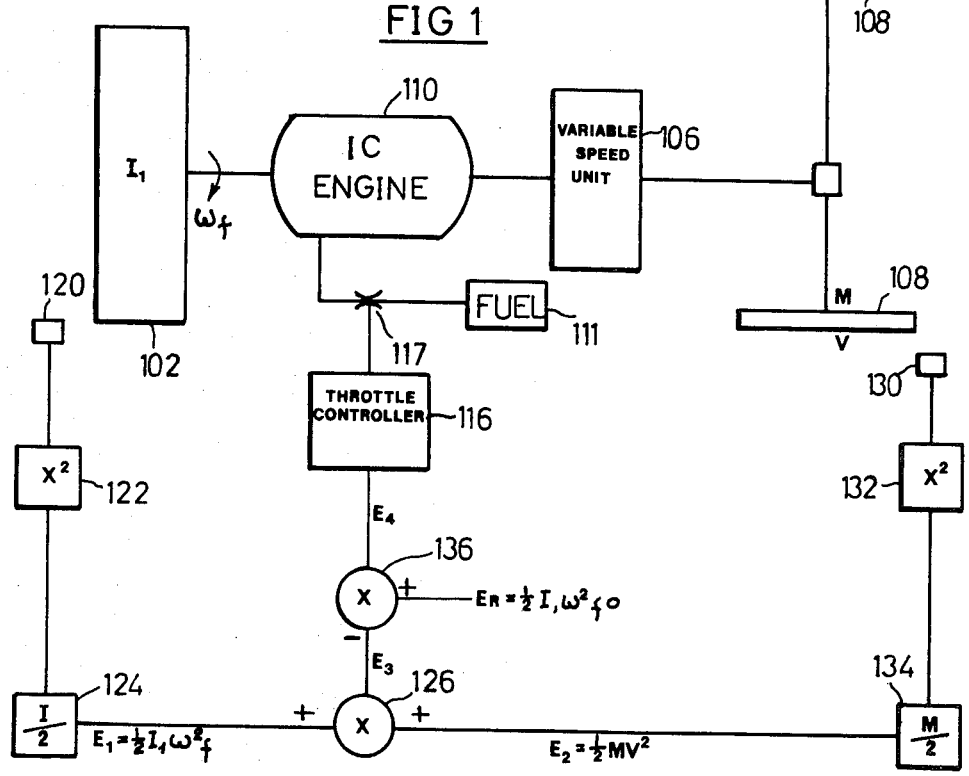
FIG. 2 is a block diagram illustrating another form of energy-responsive control system, this form including an internal combustion engine prime-mover.

The prime-mover 10 could obviously be an internal combustion engine. This is illustrated in FIG. 2 wherein the internal combustion engine is indicated by reference numeral 110 having a fuel supply 111 which is controlled by a throttle controller 116 controlling a valve 117 from the fuel supply to the engine 110. Throttle controller 116 is controlled by the error signal (E4) from summing circuit 136, exactly in the same manner as the electric motor 10 is controlled by the error signal from its summing circuit 36. Thus, the arrangement and operation of the remainder of the system as described above with respect to FIG. 1 applies also to FIG. 2, and therefore is not repeated for the sake of brevity. The same reference numerals are used in FIG. 2 for corresponding parts in FIG. 1, but raised by "100", to facilitate a comparison between corresponding elements in the two figures.

Figure 3:
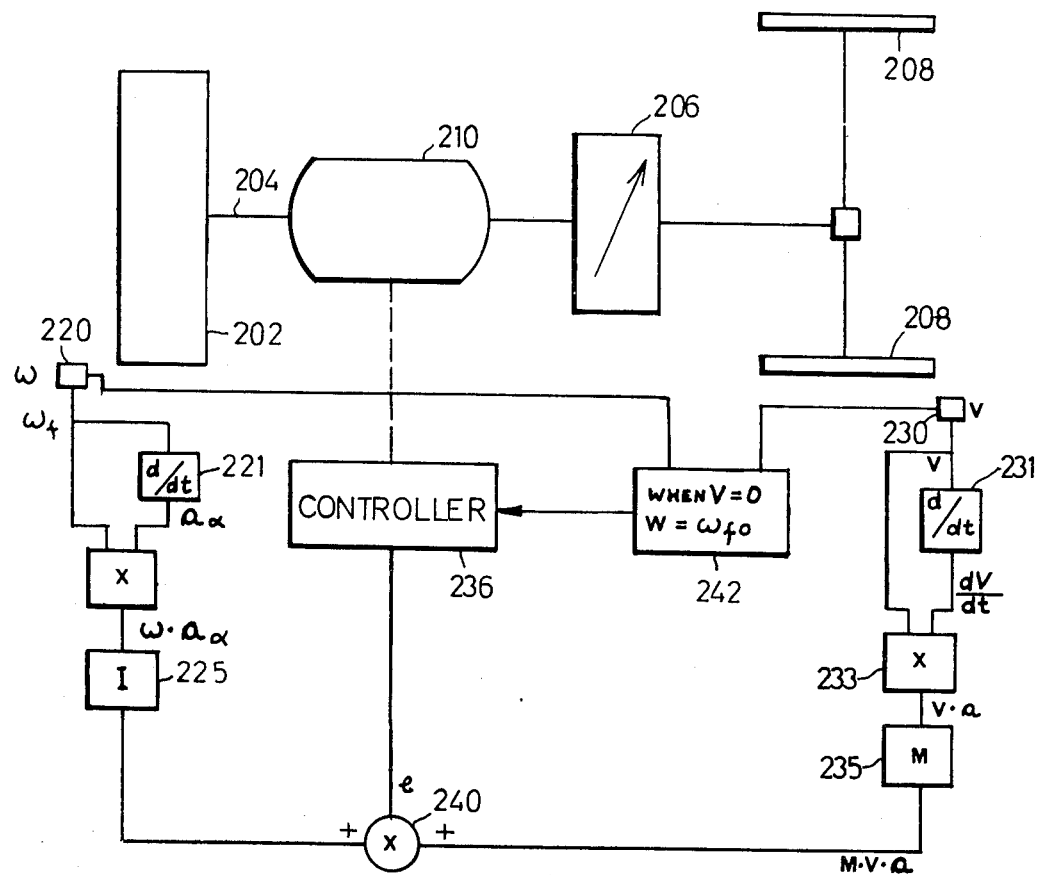
FIG. 3 is a block diagram illustrating a power-sensitive control system constructed in accordance with the invention.

The arrangements illustrated in FIGS. 1 and 2 are energy-responsive, in that the kinetic energy of the two bodies is continuously monitored and compared to a reference value to determine the amount of energy to be made up by the prime-mover. FIG. 3 illustrates an arrangement which is power-sensitive, wherein the power output (or input) of one body (e.g., the fly-wheel) is continuously compared with the power input (or output) with respect to the other body (e.g., the motor vehicle), the prime-mover being controlled to make the two power values equal. Such a power-sensitive arrangement can also be used as is apparent from the following relationships:

$$\frac{1}{2} MV^2 + \frac{1}{2} Iw^2 = C \quad (1)$$
$$d/df(\frac{1}{2}MV^2 + \frac{1}{2} Iw^2) = d C/dt \quad (2)$$
$$2 (\frac{1}{2}M) V \, dV/dt + I/2 \, 2w \, dw/dt = 0 \quad (3)$$
$$MV \, a \, (\text{linear}) = - Iwa \, (\text{angular}) \quad (4)$$

It will be seen that relationship (1) above relates to the energy-sensitive arrangement of FIGS. 1 and 2, wherein (C) represents the reference value, namely the initial kinetic energy of the flywheel when the motor vehicle velocity is zero. When relationship (1) is differentiated (relationship 2), we arrive at relationship (4) above, which represent a power-sensitive relationship.

FIG. 3 illustrates a power-sensitive arrangement that may be used. In this case, the flywheel is indicated at 202 and is coupled to a shaft 204, which shaft is coupled via variable-speed unit 206 to the motor vehicle drive wheels 208. A prime-mover 210 (e.g., an electric motor or internal combustion engine) is also coupled to shaft 204 to supply the make-up energy because of losses.

The means for measuring the power o the flywheel 202 includes a sensor 220 which measures the angular velocity of the flywheel and produces an electrical signal ($W_f$) corresponding thereto. This electrical signal is fed to a differentiating circuit 221 which differentiates the value of the velocity electric signal, thereby producing an acceleration electrical signal (a) corresponding to the rate of change of the angular velocity. This acceleration signal is fed to a multiplier 223, which multiplier also receives the angular velocity electrical signal from sensor 220, and multiplies the two values to produce an output signal ($wa\alpha$) representing the product of angular velocity and acceleration. This product signal is then fed to another multiplier circuit 225 which multiplies the foregoing product by a value corresponding to the inertia of the fly-wheel, producing an output signal ($Iwa\alpha$) which corresponds to the instantaneous power (output, if fly-wheel 202 is decelerating, and input, if it is accelerating) of the flywheel 202.

The instantaneous power inputted to or outputted from the motor vehicle is measured by a similar arrangement, including a sensor 230 which measures the linear velocity of the motor vehicles and produces an electrical signal (V) corresponding thereto, a differentiator 231 which differentiates that electrical signal and produces an signal corresponding to the linear acceleration (a linear) a multiplier 233 which multiplies the values of the angular velocity and acceleration signals (Va linear), and a further multiplier 235 which multiplies the latter value with the mass of the motor vehicle to produce an output electrical signal (MVa linear) corresponding to the instantaneous power inputted to or outputted from the motor vehicle.

The two electrical signals are fed to a summing circuit 240, which produces an output signal to controller 236 corresponding to the algebraic sum of their values. This signal causes the controller to control the prime-mover 210 to supply sufficient energy to make the power signal from flywheel 202 equal (but of opposite sign) to the power signal from motor vehicle 208.

As indicated earlier, the energy-responsive system of FIGS. 1 and 2 has the advantage that there is no accumulation of errors, as there would be in the power-responsive system; but the power-responsive system has the advantage that the errors, which accumulate, can be made up at the most convenient time, usually when the power demand from the prime-mover is the least. This is schematically shown in FIG. 3 by control block 242 which receives an input from the motor vehicle velocity sensor 230 and the flywheel velocity sensor 220, such that when the motor velocity is zero, control block 242 produces an output to controller 236 to supply sufficient energy to prime-mover 210 to bring the flywheel angular velocity to its maximum operational velocity.

While the invention has been described with respect to several peferred embodiments, it will be appreciated that many other variations, modifications and applications can be made.

What is claimed is:

1. A drive system comprising: a flywheel; a prime-mover for setting the flywheel into motion and for maintaining the motion thereof during the operation of the drive system; a driven device driven by the flywheel; a bidirectional variable speed unit coupling the flywheel to the driven device for controlling the speed thereof during the operation of the drive system such that when the driven device is accelerating it draws energy from the flywheel, and when it is decelerating it returns energy to the flywheel; and a control system automatically controlling the prime-mover to supply sufficient energy to the flywheel to make up or losses during the operation of the drive system said control system being an energy-responsive one and including: first energy measuring means for continuously measuring the energy of the flywheel; second energy measuring means for continuously measuring the energy of the driven device; summing means for summing the two measurements and for subtracting the sum from a reference value to produce a control signal corresponding to the difference between said sum and reference values; and control means for controlling the prime-mover in accordance with said control signal.

2. A drive system according to claim 1, wherein said first energy measuring means comprises: means for measuring the angular velocity of the flywheel and producing an electrical signal corresponding thereto; a squaring circuit for squaring the value of said electrical signal; and a multiplier circuit for multiplying said squared value by one-half the inertia of the fly wheel.

3. A drive system according to claim 1, wherein said driven device is a linearly-driven device, and said second measuring means comprises: means for measuring the linear velocity of the driven device and producing an electrical signal corresponding thereto; a squaring circuit for squaring the value of said latter electrical signal; and a multiplier circuit for multiplying said squared value by one-half the mass of the driven device.

4. A drive system according to claim 1, wherein said reference value is equal to the energy of the flywheel when rotating at its maximum operational velocity, at which time the driven device moves at zero velocity.

5. A drive system comprising: a flywheel; a prime-mover for setting the flywheel into motion and for maintaining the motion thereof during the operation of the drive system; a driven device driven by the flywheel; a bidirectional variable speed unit coupling the flywheel to the driven device for controlling the speed thereof during the operation of the drive system such that when the driven device is accelerating it draws energy from the flywheel, and when it is decelerating it returns energy to the flywheel; and a control system automatically controlling the prime-mover to supply sufficient energy to the flywheel to make up for losses during the operation of the drive system said control system being a powerresponsive one, and including: first power measuring means for continuously measuring the power input or output of the flywheel; second power measuring means for continuously measuring the power input or output of the driven device; summing means for subtracting one of said two measurements from the other and producing a control signal corresponding to the difference therebetween; and control means for controllng the prime-mover in accordance with said control signal.

6. A drive system according to claim 5, wherein said first power measuring means comprises: means for continuously measuring the angular veloity of the flywheel and producing a velocity electrical signal corresponding thereto; a differentiating circuit for differentiating the value of said velocity electrical signal and thereby producing an acceleration electrical signal corresponding to the rate of change of said angular velocity; nd a multiplier circuit for multiplying together the values of said velocity electrical signal and said acceleration electrical signal, and a constant value corresponding to the inertia of the flywheel.

7. A drive system according to claim 5, wherein said driven device is a linearly-driven device, and said second power measuring means comprises: means for continuously measuring the linear velocity of the driven device and producing a velocity electrical signal corresponding thereto; a differentiating circuit for differentiating the value of said latter signal to produce an acceleration electrical signal corresponding to the rate of change of said linear velocity; and a multiplier circuit for multiplying together the values of said linear velocity and acceleration electrical signals and a constant value corresponding to the mass of the driven device.

8. A drive system according to claim 5, wherein said control system further includes means effective, when the velocity of the driven device is zero, to control the prime-mover to supply sufficient energy to bring the angular velocity of the flywheel to its maximum operation velocity.

9. A drive system according to claim 3, wherein said prime-mover is an electric motor.

10. A drive system according to claim 3, wherein said prime-mover is an internal combustion engine.

* * * * *